United States Patent
Nakamura et al.

(10) Patent No.: US 8,454,745 B2
(45) Date of Patent: Jun. 4, 2013

(54) METHOD OF CONTROLLING CHEMICAL IN WET DECARBURINOZATION OF FLY ASH

(75) Inventors: Tomomichi Nakamura, Kumagaya (JP); Takao Suzuki, Chuo-ku (JP); Kazuyoshi Matsuo, Ichihara (JP)

(73) Assignees: Taiheiyo Cement Corporation, Tokyo (JP); Mitsui Enigneering and Shipbuilding Co. Ltd., Tokyo (JP)

( * ) Notice: Subject to any disclaimer, the term of this patent is extended or adjusted under 35 U.S.C. 154(b) by 0 days.

(21) Appl. No.: 12/922,645

(22) PCT Filed: Mar. 17, 2009

(86) PCT No.: PCT/JP2009/055116
§ 371 (c)(1),
(2), (4) Date: Nov. 3, 2010

(87) PCT Pub. No.: WO2009/122895
PCT Pub. Date: Oct. 8, 2009

(65) Prior Publication Data
US 2011/0036271 A1  Feb. 17, 2011

(30) Foreign Application Priority Data
Mar. 31, 2008 (JP) ................................ 2008-090830

(51) Int. Cl.
C04B 14/00 (2006.01)
C04B 18/06 (2006.01)
B03D 1/14 (2006.01)
B03B 5/60 (2006.01)
B03B 5/64 (2006.01)
B03D 1/00 (2006.01)

(52) U.S. Cl.
USPC ....... 106/705; 106/DIG. 1; 209/163; 209/169

(58) Field of Classification Search
USPC .................................. 106/705; 209/163, 169
See application file for complete search history.

(56) References Cited

U.S. PATENT DOCUMENTS 6,041,941 A * 3/2000 Newell et al. ................. 209/164
2007/0199486 A1* 8/2007 Saito et al. .................... 110/344
2009/0008302 A1* 1/2009 Matsuo et al. ................ 209/166

FOREIGN PATENT DOCUMENTS
JP        3613347 B1   1/2005
JP        200615190    1/2006

(Continued)

Primary Examiner — Kaj K Olsen
Assistant Examiner — Karam Hijji
(74) Attorney, Agent, or Firm — Stetina Brunda Garred & Brucker

(57) ABSTRACT

To reduce cost of chemical by reducing quantity of foaming agent used when removing unburned carbon in fly ash with wet floatation and to prevent decrease in activity index of the fly ash. In wet decarburization of fly ash, the solution comprising the steps of: adding water to fly ash to generate slurry; adding hydrophobizing agent and foaming agent to the slurry and agitating them to generate bubbles; and adhering unburned carbon in the fly ash to the bubbles to float them to remove the unburned carbon in the fly ash, when sedimentation component at wet floatation separation is solid-liquid separated and liquid phase obtained by solid-liquid separation is reused for another floatation separation for new fly ash, the quantity of foaming agent added to the slurry is adjusted such that concentration of the foaming agent in liquid phase is in a predetermined range. When adjusting the concentration of the foaming agent in the liquid phase, it is possible to measure COD concentration in the liquid phase and adjust the quantity of the foaming agent added to the slurry in such a manner that the COD concentration is in a predetermined range.

7 Claims, 3 Drawing Sheets

FOREIGN PATENT DOCUMENTS

| | | |
|---|---|---|
| JP | 2007167825 A | 7/2007 |
| JP | 2007181748 A | 7/2007 |
| JP | 200754797 | 8/2007 |
| WO | WO 2007074627 A1 * | 7/2007 |

* cited by examiner

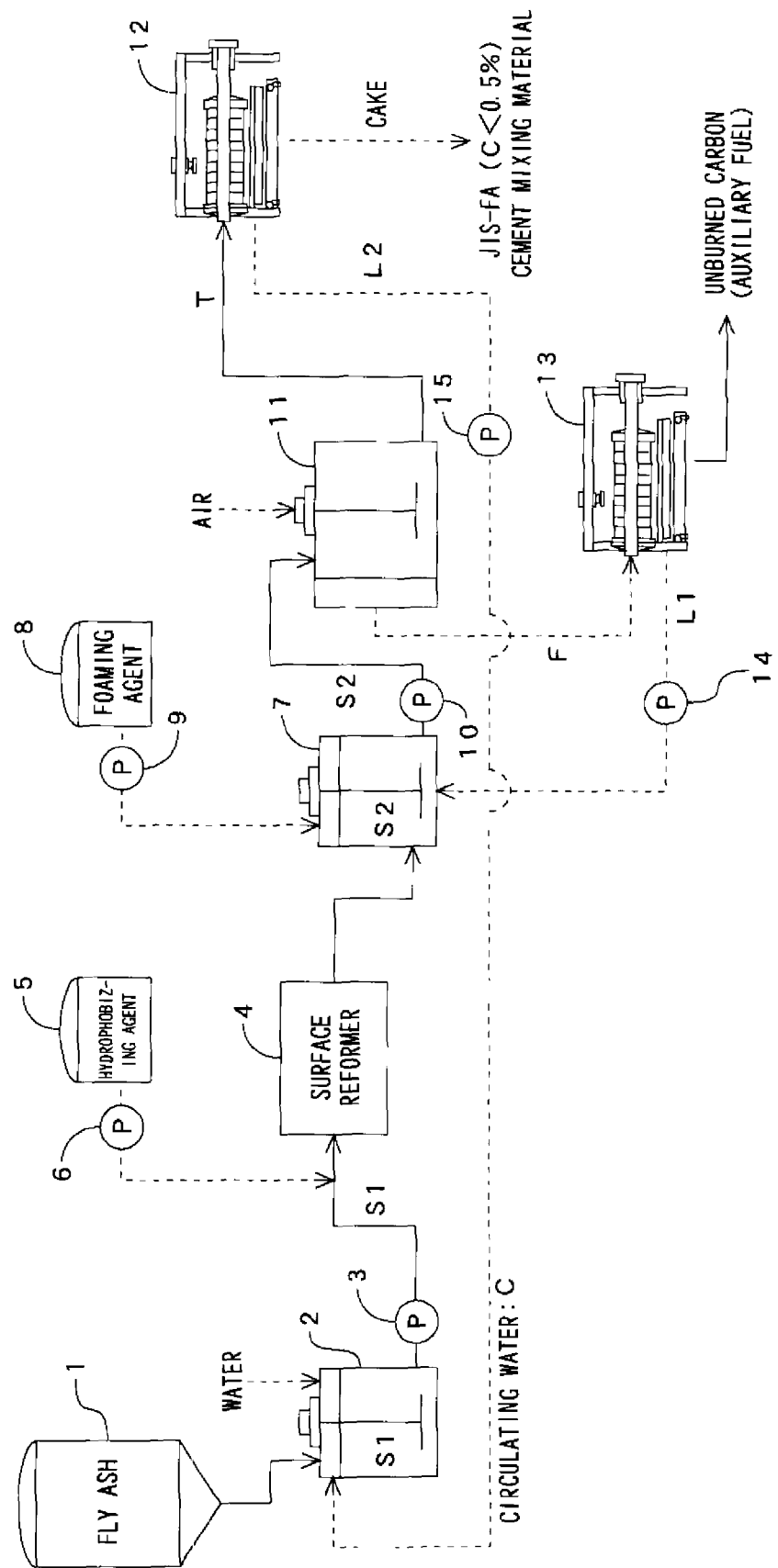

METHOD OF CONTROLLING CHEMICAL IN WET DECARBURINOZATION OF FLY ASH

CROSS-REFERENCE TO RELATED APPLICATIONS

The present application claims priority to International Application No. PCT/JP2009/55116 filed on Mar. 17, 2009, which claims priority to Japanese Patent Application No. 2008-090830 filed on Mar. 31, 2008.

STATEMENT RE: FEDERALLY SPONSORED RESEARCH/DEVELOPMENT

Not Applicable

BACKGROUND OF THE INVENTION

1. Technical Field of the Invention

The present invention relates to a method of managing chemical used for removing unburned carbon in fly ash with wet floatation.

2. Description of the Related Art

Conventionally, although fly ash generated at a coal fired power plant and the like is used for a mixing material for cement, an admixture for concrete, a raw material for an artificial lightweight aggregate and the like, since various problems will occur when much unburned carbon is contained in fly ash, it is necessary to remove the unburned carbon. Therefore, many arts have been proposed. Especially, when the fly ash is used as a mixing material for cement, it is considered to be the most economical method to reduce facility and operating costs that after decarburization treatment with wet floatation, wet ash is fed to a cement mill.

Here, as an example of a method of removing unburned carbon in fly ash that is utilized as a mixing material for cement, a method described in patent document 1 will briefly be explained with reference to FIG. 3.

After storing fly ash transported as a waste from a coal fired power plant and so on in a fly ash tank 1, the fly ash is supplied to a slurry tank 2 and mixed with water to generate slurry S1. Next, the fly ash slurry S1 in the slurry tank 2 is supplied to a surface reformer 4 through a pump 3. And, to the surface reformer 4 is supplied light oil as a hydrophobizing agent from a hydrophobizing agent tank 5 through a pump 6.

Next, in the surface reformer 4, to the slurry S1 to which hydrophobizing agent is added is added shearing force, and particles contained in the slurry S1 are crushed into micro pieces. The slurry S1 to which shearing force is added and other treatments are performed is supplied to an adjustment tank 7 from the surface reformer 4. Besides, to the adjustment tank 7 is supplied a foaming agent from a foaming agent tank 8 through a pump 9, and in the adjustment tank 7 are mixed the slurry S1 and the foaming agent to generate slurry S2.

Then, while the slurry S2 is supplied to a floatation machine 11 through a pump 10, air is supplied to the floatation machine 11 to generate bubbles in the floatation machine 11, and to the bubbles are adhered unburned carbon adsorbed to the hydrophobizing agent, and floating bubbles to which the unburned carbon are adhered are removed. With this, unburned carbon contained in the fly ash can be removed.

After that, froth F containing unburned carbon discharged from the floatation machine 11 is solid-liquid separated with a filter press 13 to recover the unburned carbon. It is possible to utilize the recovered unburned carbon as an auxiliary fuel in a cement kiln and the like. On the other hand, filtrate L1 generated by the filter press 13 is added to the adjustment tank 7 through a pump 14, or in the floatation machine 11, the filtrate L1 is reused for defoaming to cause unburned carbon to be adhered to the bubbles.

Meanwhile, tail T containing fly ash from the floatation machine 11 is solid-liquid separated with a filter press 12, and the fly ash whose unburned carbon content was made under 0.5 mass percent is used as a cement mixing material. On the other hand, filtrate L2 solid-liquid separated with a filter press 12 (hereinafter referred to as "circulating water C") is cause to be circulated to the slurry tank 2 through a pump 15 to reduce chemical cost by reusing foaming agent remaining in the circulating water C.

Patent document 1: Japan Patent 3613347 gazette

However, in the conventional method of removing unburned carbon in fly ash described above, in order to continue stable operation of the floatation machine 11, the degree of foaming of the foaming agent in the floatation machine 11 was observed with eyes to determine an additional amount of foaming agent from the foaming agent tank 8 to the adjustment tank 7, so that management of the additional amount of foaming agent was not enough, which causes effect of reducing chemical cost not to reach an expected extent.

Further, since the management of additional amount of foaming agent was not sufficient, there was a case where the foaming agent was excessively supplied to the adjustment tank 7, and in such a case, the activity index of the fly ash lowered, and when the fly ash with a low activity index was utilized for a mixing material for cement, it might cause lowered initial strength of cement.

SUMMARY OF THE INVENTION

Therefore, the present invention has been made in consideration of the above problems in the conventional art, and the object thereof is to provide a chemical management method in wet decarburization of fly ash capable of reducing the quantity of foaming agent used for removing unburned carbon in fly ash with wet floatation to reduce chemical cost as well as preventing decrease in the activity index of the fly ash.

The present inventors, to achieve the above object, have made diligent studies and found that when sedimentation component at wet floatation separation for removing unburned carbon in fly ash is solid-liquid separated, and obtained liquid phase (corresponds to the above "circulating water C") is reused for floatation separation for new fly ash, managing a concentration of foaming agent in the liquid phase is able to reduce the quantity of foaming agent.

The present invention has been made based on the above knowledge, and relates to a chemical management method in wet decarburization of fly ash comprising the steps of: adding water to the fly ash to generate slurry; adding hydrophobizing agent and foaming agent to the slurry and agitating them to generate bubbles; and adhering unburned carbon in the fly ash to the bubbles to float them to remove the unburned carbon in the fly ash, and this method is characterized by comprising the steps of: solid-liquid separating sedimentation component at the wet floatation separation; and reusing obtained liquid phase by the solid-liquid separation for another floatation separation for new fly ash, wherein quantity of the foaming agent added to the slurry is adjusted such that a concentration of the foaming agent in the liquid phase is in a predetermined range.

And, with this invention, instead of observing, with eyes, the degree of foaming of the foaming agent in the floatation machine as before, managing the concentration of foaming agent in the liquid phase obtained by solid-liquid separating sedimentation component at wet floatation separation in a predetermined range is able to settle the concentration of foaming agent at the floatation separation, which makes it possible to remove the unburned carbon in the fly ash by a necessary minimum amount of foaming agent. In addition, as the concentration of foaming agent becomes stable, foaming agent is not supplied excessively, and reduction in the activity index of the fly ash can be prevented.

In adjusting the concentration of foaming agent in the liquid phase to a predetermined range, it is possible to measure COD (Chemical Oxygen Demand) concentration of the liquid phase and adjust the quantity of foaming agent added to the slurry such that the COD concentration is in a predetermined range. Since the concentration of foaming agent in the liquid phase has a close relation with the COD concentration in the liquid phase, and measurement of the COD concentration can be carried out easily and quickly through a simple method such as a pack test and a method with a COD measurement device 16, the quantity of foaming agent can efficiently be managed at low cost.

In the above chemical management method in wet decarburization of fly ash, the concentration of foaming agent in the liquid phase is possibly be set between 200 mg and 4000 mg per 1 kg of the fly ash separated through wet floatation separation.

As mentioned above, with this invention, while reducing the quantity of foaming agent and others used when removing unburned carbon in fly ash with wet floatation to reduce cost of chemical, it is possible to prevent decrease in the activity index of the fly ash.

BRIEF DESCRIPTION OF THE DRAWINGS

FIG. 3 is a flowchart showing an example of a whole construction of a conventional wet decarburization system of fly ash.

DETAILED DESCRIPTION OF THE INVENTION

Next, embodiments of the present invention will be explained with reference to figures.

Figure 1:
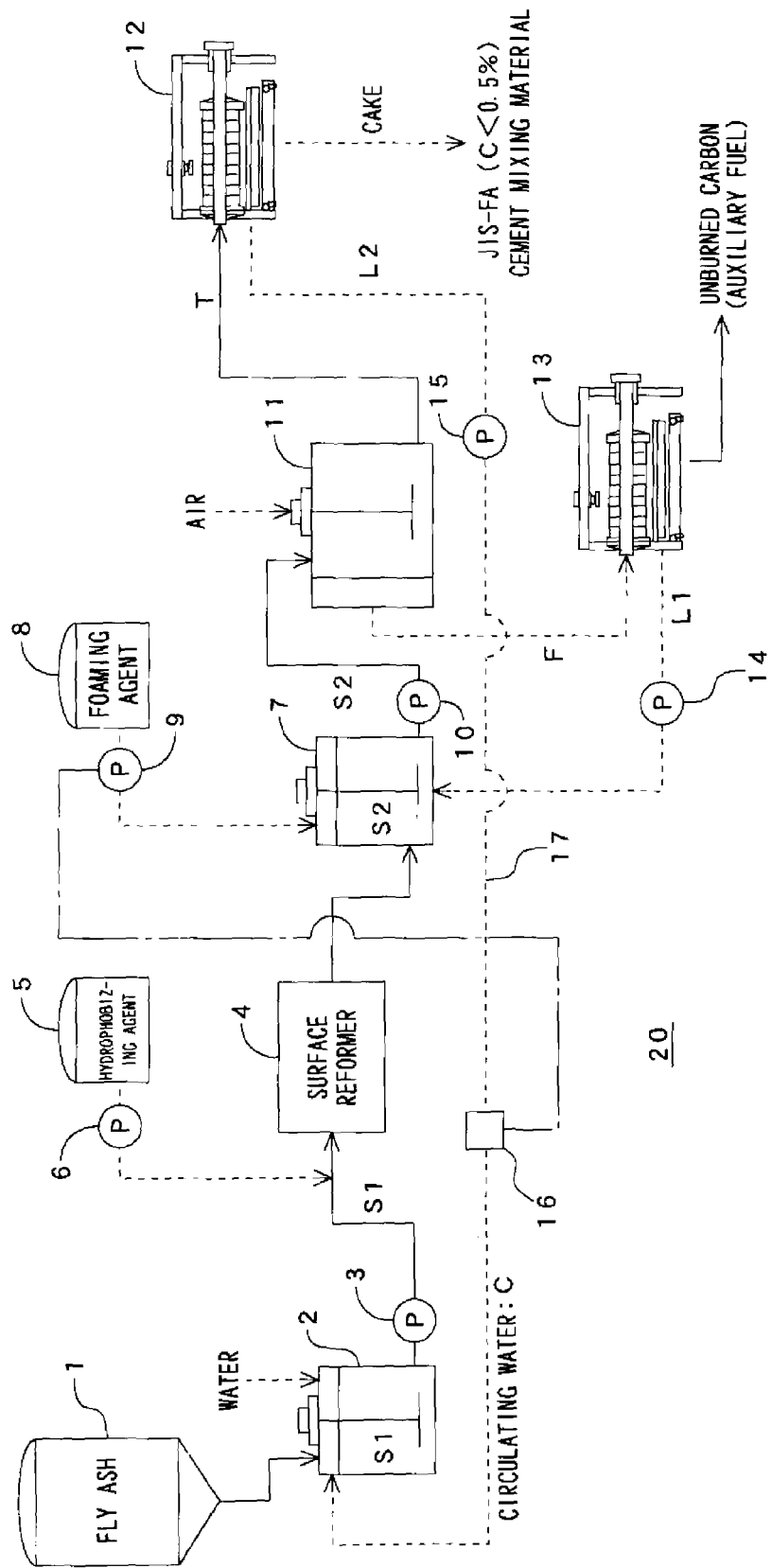
FIG. 1 is a flowchart showing a whole construction of a wet decarburization system of fly ash to which a chemical management method according to the present invitation is applied.

FIG. 1 shows a wet decarburization system of fly ash to which a chemical management method according to the present invention is applied, and the basic construction of this system 20 is the same as the conventional system shown in FIG. 3, so that to the same constituent factors are attached the same reference numbers and the explanation thereof will be omitted.

The system 20 is characterized by having, in addition to the construction of the system shown in FIG. 3; a COD measurement device 16 on a circulation route 17 for returning the filtrate L2 (hereinafter referred to as "circulating water C") to the slurry tank 2, and managing quantity of foaming agent supplied to the adjustment tank 7 from the foaming agent tank 8 with the pump 9 in accordance with the COD concentration in the circulating water C that is measured with this COD measurement device 16.

Figure 2:
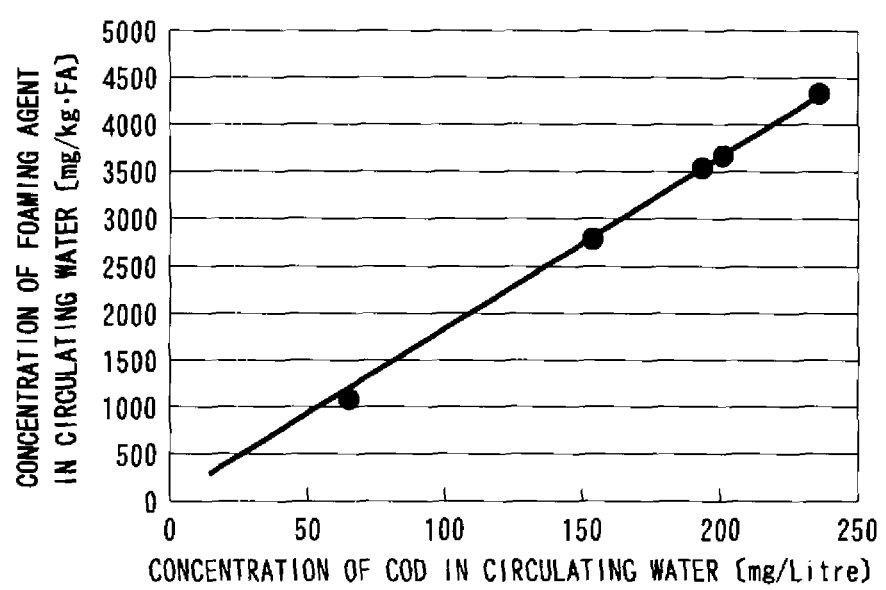
FIG. 2 is a graph showing the relation between foaming agent concentration and COD concentration in circulating water.

As shown in FIG. 2, the COD concentration in the circulating water C has a close relation with the foaming agent concentration in the circulating water C, and the COD concentration can easily and quickly be measured with the COD measurement device 16 and so on, so that instead of directly measuring the foaming agent concentration in the circulating water C, it is more efficient to measure the COD concentration in the circulating water C with the COD measurement device 16 and convert this measurement value into the foaming agent concentration in the circulating water C. For example, in case that the target value of foaming agent concentration in the circulating water C is set to be 1500 mg/kg of fly ash, the COD concentration in the circulating water C becomes approximately 80 mg/L.

In removing unburned carbon in fly ash with the floatation machine 11, the foaming agent concentration in the circulating water C is preferably be controlled between 200 mg and 4000 mg per 1 kg of the fly ash (between 200 mg/kg-FA and 4000 mg/kg-FA) supplied to the floatation machine 11. Therefore, from the relation shown in FIG. 2, the quantity of the foaming agent supplied to the adjustment tank 7 from the foaming agent tank 8 is controlled to retain the COD concentration in the circulating water C measured with the COD measurement device 16 between 11 mg/L and 220 mg/L. In case that the foaming agent concentration in the circulating water C is less than 11 mg/kg-FA, the quantity of foaming agent in the floatation machine 11 is insufficient, so that the floatation efficiency decreases. On the other hand, when the foaming agent concentration in the circulating water C exceeds 220 mg/kg-FA, it is not desirable since improvement in the floatation efficiency corresponding to the increase in quantity of foaming agent is not expected and the activity index of the fly ash decreases.

In the above control of the additional amount of foaming agent to the adjustment tank 7 based on the measurement value of the COD concentration with the COD measurement device 16, an automation with a generally used automatic control device may be adopted, and it is also possible to carry out the measurement by an operator at a plant site, or in a different place with a collected sample by using the COD measurement device 16, and adjust the additional amount of foaming agent to the adjustment tank 7 from the foaming agent tank 8 at the plant site or by remote control according to the measured value.

Activity indices were measured in connection with modified fly ash (modified powder) subjected to wet decarburization with the above chemical management method, and fly ash (raw powder) without the wet decarburization, in which the foaming agent concentration in the circulating water C changes over 3 levels. Measurement results are shown in Table 1. The activity index means a compressive strength ratio of mortar, to which fly ash is mixed, to cement mortar itself, which is based on JIS A 6201, and the mixing ratio of the fly ash was made into 25%. The regulation values of JIS A 6201 (fly ash for concrete) are 80% or higher at 28 days of material age and 90% or higher at 91 days of material age.

TABLE 1

|  |  | Activity index (%) | | Ig. loss (%) | | Concentration of foaming agent in circulating water |
|---|---|---|---|---|---|---|
|  |  | Raw powder | Modified powder | Raw powder | Modified powder | |
| Level I | Age 28 days (%) | 85 | 76 | 2.7 | 0.7 | 5000 mg/kg-FA |
|  | Age 91 days (%) | 99 | 89 | | | |
| Level II | Age 28 days (%) | 81 | 79 | 5.9 | 1.8 | 2000 mg/kg-FA |
|  | Age 91 days (%) | 91 | 89 | | | |
| Level III | Age 28 days (%) | 78 | 78 | 3.0 | 0.8 | — |
|  | Age 91 days (%) | 91 | 90 | | | (COD concentration <100 mg/Litre) |

As shown in the table, though there is much difference in activity indices between the raw powder and the modified powder when the foaming agent concentration in the circulating water C in level I is 5000 mg/kg-FA, the difference becomes almost the same in 2000 mg/kg-FA, and further lowering the foaming agent concentration allows the both activity indices to become the same, or the difference between them to become very little.

As mentioned above, in this invention, maintaining the foaming agent concentration in the circulating water C in a predetermined range allows unburned carbon in the fly ash to be removed with a necessary minimum amount of foaming agent, so that the foaming agent concentration in the floatation machine 11 becomes stable, resulting in reduction in the amount of foaming agent used, that is, reduction in the chemical cost, while avoiding an excessive supply of foaming agent, decrease in the activity index of the fly ash, and in its turn, decrease in the initial strength of cement for which the modified fly ash is utilized as a mixing material.

Meanwhile, in the above embodiment, since the COD concentration in the circulating water C can more easily and quickly be measured, and the COD concentration and the foaming agent concentration in the circulating water C have a close relation between them, without directly measuring the foaming agent concentration in the circulating water C, the COD concentration in the circulating water C is measured and the COD concentration is controlled to be in a predetermined range to obtain the same effect as the case where the foaming agent concentration in the circulating water C is directly controlled, as a matter of course, it is possible to directly measure the foaming agent concentration in the circulating water C. In addition, it is also possible to indirectly obtain the foaming agent concentration in the circulating water C from measurement value other than the COD concentration in the circulating water C.

| EXPLANATION OF REFERENCE NUMBERS | |
|---|---|
| 1 | fly ash tank |
| 2 | slurry tank |
| 3 | pump |
| 4 | surface reformer |
| 5 | hydrophobizing agent tank |
| 6 | pump |
| 7 | adjustment tank |
| 8 | foaming agent tank |
| 9 | pump |
| 10 | pump |
| 11 | floatation machine |
| 12 | filter press |
| 13 | filter press |
| 14 | pump |
| 15 | pump |

-continued

| EXPLANATION OF REFERENCE NUMBERS | |
|---|---|
| 16 | COD measurement device |
| 17 | circulation route |
| 20 | wet decarburization system of fly ash |

The invention claimed is:

1. In wet decarburization of fly ash comprising the steps of: adding water to fly ash to generate slurry; adding hydrophobizing agent and foaming agent to the slurry and agitating them to generate bubbles; and adhering unburned carbon in said fly ash to the bubbles to float them to remove the unburned carbon in the fly ash, a chemical management method comprising the steps of:
separating the slurry into a sedimentation component and a liquid phase, the concentration of foaming agent in the liquid phase being associated with a chemical oxygen demand (COD) concentration in the liquid phase;
reusing the liquid phase obtained by said separation step for another floatation separation for new fly ash;
determining the concentration of foaming agent in the liquid phase obtained by said separation step using a measuring device to measure the COD concentration in the liquid phase, the measured COD concentration in the liquid phase being converted into the concentration of foaming agent in the liquid phase obtained by said separation step; and
adding foaming agent to the liquid phase obtained by said separation step, wherein the quantity of said foaming agent added to the liquid phase obtained by said separation step is adjusted in accordance with the determined concentration of the foaming agent in the liquid phase obtained from the separating step.

2. The chemical management method in wet decarburization of fly ash as claimed in claim 1, wherein said concentration of the foaming agent in the liquid phase is set between 200 mg and 4000 mg per 1 kg of the fly ash separated with the wet floatation separation.

3. The method recited in claim 1 wherein the COD concentration is measured using a pack test.

4. The method recited in claim 1, wherein the adding step is performed automatically in response to determining the concentration of foaming agent in the liquid phase obtained by said separation step.

5. A method of controlling a chemical in wet decarburization of fly ash comprising the steps of:
adding water to fly ash to generate a slurry;
adding as hydrophobizing agent and a foaming agent to the slurry,
agitating the slurry to generate bubbles causing the unburned carbon to adhere to the bubbles;

separating the slurry into a sedimentation component and a liquid component;

measuring a chemical oxygen demand (COD) concentration in the liquid component using a measuring device;

converting the measured COD concentration into the concentration of foaming agent in the liquid component obtained by said separation step to determine the concentration of foaming agent in the liquid phase obtained by said separation step; and adding foaming agent to the liquid component obtained by said separation step to reconstitute the slurry for another floatation separation, wherein the amount of foaming agent added to the liquid component is adjusted in accordance with a concentration of foaming agent in the liquid component obtained by said separation step to prevent a decrease in activity index in fly ash used as a cement mixing material.

6. The method recited in claim 5, wherein said concentration of the foaming agent in the liquid phase is set between 200 mg and 4000 mg per 1 kg the fly ash separated with the wet floatation separation.

7. The method recited in claim 5 wherein the adding step is performed automatically in response to determining the concentration of foaming agent in the liquid phase obtained by said separation step.

* * * * *